United States Patent
Oneda

(10) Patent No.: US 8,615,705 B2
(45) Date of Patent: Dec. 24, 2013

(54) DOCUMENT MANAGEMENT APPARATUS AND COMPUTER READABLE MEDIUM STORING PROGRAM

(75) Inventor: Yuichi Oneda, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 112 days.

(21) Appl. No.: 13/150,910

(22) Filed: Jun. 1, 2011

(65) Prior Publication Data

US 2012/0072834 A1 Mar. 22, 2012

(30) Foreign Application Priority Data

Sep. 21, 2010 (JP) .................................. 2010-210495

(51) Int. Cl.
*G06F 17/00* (2006.01)

(52) U.S. Cl.
USPC .......................................... 715/200; 715/255

(58) Field of Classification Search
USPC ................................................ 715/200, 255
See application file for complete search history.

(56) References Cited

U.S. PATENT DOCUMENTS

| | | | | |
|---|---|---|---|---|
| 5,809,218 | A * | 9/1998 | Kastenholz et al. | 358/1.16 |
| 5,875,038 | A * | 2/1999 | Gerber | 358/402 |
| 5,895,470 | A * | 4/1999 | Pirolli et al. | 707/727 |
| 6,134,568 | A * | 10/2000 | Tonkin | 715/209 |
| 6,668,354 | B1 * | 12/2003 | Chen et al. | 715/255 |
| 6,690,477 | B2 * | 2/2004 | Nakagiri et al. | 358/1.12 |
| 7,791,777 | B2 * | 9/2010 | Barry et al. | 358/518 |
| 7,898,696 | B2 * | 3/2011 | Marchesotti et al. | 358/3.27 |
| 7,907,308 | B2 * | 3/2011 | Namikata | 358/3.28 |
| 8,046,359 | B2 * | 10/2011 | Minami et al. | 707/736 |
| 8,049,917 | B2 * | 11/2011 | Noguchi et al. | 358/1.15 |
| 8,218,190 | B2 * | 7/2012 | Kanaya et al. | 358/1.18 |
| 8,248,644 | B2 * | 8/2012 | Urakawa | 358/1.15 |
| 8,271,864 | B2 * | 9/2012 | Lynggaard et al. | 715/200 |
| 8,405,873 | B2 * | 3/2013 | Harada | 358/1.9 |
| 2001/0029513 | A1 * | 10/2001 | Kuwano et al. | 707/522 |
| 2004/0015782 | A1 * | 1/2004 | Day et al. | 715/517 |
| 2004/0177324 | A1 * | 9/2004 | Simmons et al. | 715/530 |
| 2004/0215607 | A1 * | 10/2004 | Travis, Jr. | 707/3 |
| 2006/0061817 | A1 * | 3/2006 | Kakigi et al. | 358/1.15 |
| 2006/0268303 | A1 * | 11/2006 | Yamada | 358/1.12 |
| 2007/0165904 | A1 * | 7/2007 | Nudd et al. | 382/100 |
| 2007/0241191 | A1 | 10/2007 | Onishi | |
| 2007/0242305 | A1 | 10/2007 | Onishi | |

(Continued)

FOREIGN PATENT DOCUMENTS

| | | |
|---|---|---|
| JP | 2007-286698 A | 11/2007 |
| JP | 2007-288285 A | 11/2007 |
| JP | 2008-046988 A | 2/2008 |
| JP | 2008-048285 A | 2/2008 |

OTHER PUBLICATIONS

Horn, Structured Writing as a Paradigm, Google 1998, pp. 1-22.*

(Continued)

*Primary Examiner* — Cong-Lac Huynh
(74) *Attorney, Agent, or Firm* — Sughrue Mion, PLLC

(57) ABSTRACT

A document management apparatus includes: a memory that holds an electronic document of plural pages; a written information acquisition unit that obtains information on writing with respect to respective pages of recording media on which the electronic document stored in the memory is outputted; and a page arrangement generation unit that generates a page arrangement of the electronic document based on the information on the writing obtained by the written information acquisition unit.

5 Claims, 11 Drawing Sheets

| RECORDING MEDIUM ID | WRITING TIME | | RECORDING MEDIUM ID | WRITING TIME |
|---|---|---|---|---|
| a1 | 2010:09:02 08:00:10 ① | | a1 | 2010:09:02 08:00:10 ① |
| a1 | ~~2010:09:02 08:00:30~~ ② | → | b2 | 2010:09:02 08:05:10 ④ |
| a1 | ~~2010:09:02 08:00:50~~ ③ | | a3 | 2010:09:02 08:10:30 ⑤ |
| a2 | 2010:09:05 08:07:30 ⑦ | | | |
| a3 | 2010:09:02 08:10:30 ⑤ | | b1 | 2010:09:05 08:00:20 ⑥ |
| b1 | 2010:09:05 08:00:20 ⑥ | → | a2 | 2010:09:05 08:07:30 ⑦ |
| b2 | 2010:09:02 08:05:10 ④ | | b3 | 2010:09:05 08:11:20 ⑧ |
| b3 | 2010:09:05 08:11:20 ⑧ | | | |
| b3 | ~~2010:09:05 08:11:40~~ ⑨ | | c1 | 2010:09:05 10:00:10 ⑩ |
| | | | c2 | 2010:09:05 10:05:20 ⑪ |
| c1 | 2010:09:05 10:00:10 ⑩ | | | |
| c2 | 2010:09:05 10:05:20 ⑪ | | c3 | 2010:09:05 10:09:10 ⑬ |
| c2 | ~~2010:09:05 10:05:40~~ ⑫ | | | |
| c3 | 2010:09:05 10:09:10 ⑬ | | | |
| c3 | ~~2010:09:05 10:09:30~~ ⑭ | | | |

(56) References Cited

U.S. PATENT DOCUMENTS

| | | | |
|---|---|---|---|
| 2008/0033969 A1* | 2/2008 | Koo et al. | 707/100 |
| 2008/0072180 A1* | 3/2008 | Chevalier et al. | 715/861 |
| 2008/0264701 A1* | 10/2008 | Radtke et al. | 178/19.01 |
| 2009/0157620 A1* | 6/2009 | Kim et al. | 707/3 |
| 2009/0195828 A1* | 8/2009 | Urakawa | 358/1.15 |
| 2010/0251110 A1* | 9/2010 | Mitani | 715/273 |
| 2010/0299322 A1* | 11/2010 | Zhang | 707/722 |
| 2010/0325535 A1* | 12/2010 | Reddy | 715/246 |
| 2011/0004819 A1* | 1/2011 | Hazard | 715/221 |
| 2011/0060910 A1* | 3/2011 | Gormish et al. | 713/176 |
| 2011/0061092 A1* | 3/2011 | Bailloeul et al. | 726/4 |
| 2011/0063681 A1* | 3/2011 | Onishi | 358/1.18 |
| 2011/0064328 A1* | 3/2011 | Ishizuka | 382/266 |
| 2011/0145246 A1* | 6/2011 | Prager et al. | 707/737 |
| 2011/0161808 A1* | 6/2011 | Wang | 715/255 |
| 2012/0092712 A1* | 4/2012 | Matsumoto | 358/1.15 |

OTHER PUBLICATIONS

Hansen et al., Reading and Writing with Computers: A Framework for Explaining Differences in Performance, ACM 1988, pp. 1080-1089.*

* cited by examiner

DOCUMENT MANAGEMENT SYSTEM 1

FIG. 5A

| DOCUMENT ID | | RECORDING MEDIUM ID | REFLECTED DOCUMENT INFORMATION ID |
|---|---|---|---|
| DOCUMENT NUMBER | PAGE NUMBER | | |
| 0001 | (1) | a1 | 0001-A0 |
| 0001 | (2) | a2 | 0001-A0 |
| 0001 | (3) | a3 | 0001-A0 |
| ... | ... | ... | ... |
| 0001 | (1) | b1 | 0001-B0 |
| 0001 | (2) | b2 | 0001-B0 |
| 0001 | (3) | b3 | 0001-B0 |
| ... | ... | ... | ... |
| 0001 | (1) | c1 | 0001-C0 |
| 0001 | (2) | c2 | 0001-C0 |
| 0001 | (3) | c3 | 0001-C0 |
| ... | ... | ... | ... |

FIG. 5B

| RECORDING MEDIUM ID | WRITING TIME |
|---|---|
| a1 | 2010:08:30 11:32:10 |
| a2 | 2010:08:30 11:32:23 |
| a3 | 2010:08:30 11:32:31 |
| ... | ... |
| b1 | 2010:09:03 09:12:05 |
| b2 | 2010:09:03 09:12:22 |
| b3 | 2010:09:03 09:13:21 |
| ... | ... |
| c1 | 2010:09:03 18:45:02 |
| c2 | 2010:09:03 18:46:22 |
| c3 | 2010:09:03 18:48:30 |
| ... | ... |

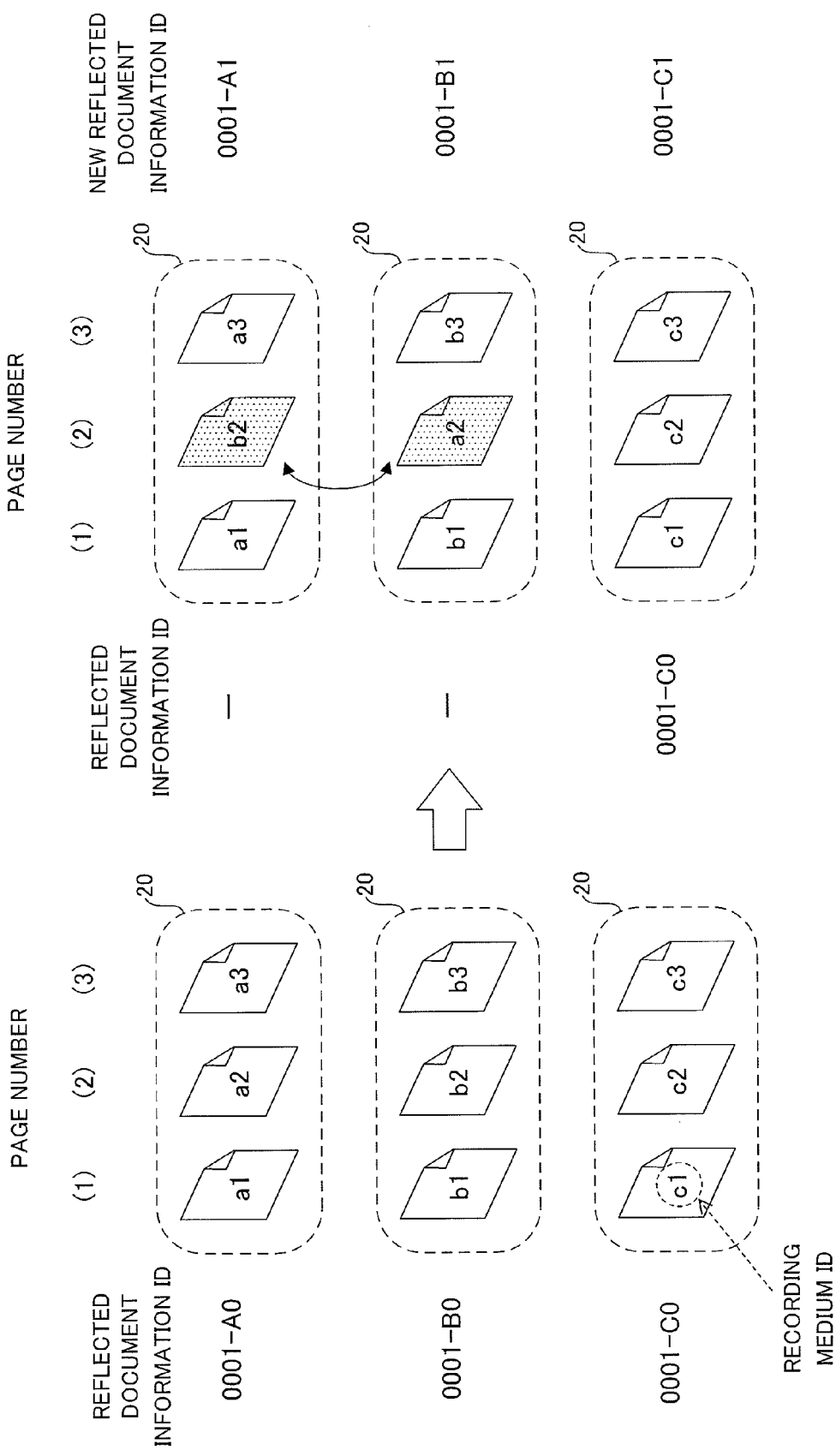

FIG. 9A

| RECORDING MEDIUM ID | WRITING TIME | |
|---|---|---|
| a1 | 2010:09:02 08:00:10 | ① |
| a1 | 2010:09:02 08:00:30 | ② |
| a1 | 2010:09:02 08:00:50 | ③ |
| a2 | 2010:09:02 08:07:30 | ⑦ |
| a3 | 2010:09:02 08:10:30 | ⑤ |
| b1 | 2010:09:05 08:00:20 | ⑥ |
| b2 | 2010:09:02 08:05:10 | ④ |
| b3 | 2010:09:05 08:11:20 | ⑧ |
| b3 | 2010:09:05 08:11:40 | ⑨ |
| c1 | 2010:09:05 10:00:10 | ⑩ |
| c2 | 2010:09:05 10:05:20 | ⑪ |
| c2 | 2010:09:05 10:05:40 | ⑫ |
| c3 | 2010:09:05 10:09:10 | ⑬ |
| c3 | 2010:09:05 10:09:30 | ⑭ |

FIG. 9B

| RECORDING MEDIUM ID | WRITING TIME | |
|---|---|---|
| a1 | 2010:09:02 08:00:10 | ① |
| b2 | 2010:09:02 08:05:10 | ④ |
| a3 | 2010:09:02 08:10:30 | ⑤ |
| b1 | 2010:09:05 08:00:20 | ⑥ |
| a2 | 2010:09:05 08:07:30 | ⑦ |
| b3 | 2010:09:05 08:11:20 | ⑧ |
| c1 | 2010:09:05 10:00:10 | ⑩ |
| c2 | 2010:09:05 10:05:20 | ⑪ |
| c3 | 2010:09:05 10:09:10 | ⑬ |

FIG. 9C

| RECORDING MEDIUM ID | WRITING TIME | | NEW REFLECTED DOCUMENT INFORMATION ID |
|---|---|---|---|
| a1 | 2010:09:02 08:00:10 | ① | 0001-A1 |
| b2 | 2010:09:02 08:05:10 | ④ | |
| a3 | 2010:09:02 08:10:30 | ⑤ | |
| b1 | 2010:09:05 08:00:20 | ⑥ | 0001-B1 |
| a2 | 2010:09:05 08:07:30 | ⑦ | |
| b3 | 2010:09:05 08:11:20 | ⑧ | |
| c1 | 2010:09:05 10:00:10 | ⑩ | 0001-C1 |
| c2 | 2010:09:05 10:05:20 | ⑪ | |
| c3 | 2010:09:05 10:09:10 | ⑬ | |

FIG. 11A

| RECORDING MEDIUM ID | WRITING TIME | WRITING TOOL ID |
|---|---|---|
| a1 | ① | P1 |
| a1 | ② | P1 |
| a1 | ③ | P1 |
| a2 | ⑫ | P1 |
| a3 | ⑧ | P1 |

| RECORDING MEDIUM ID | WRITING TIME | WRITING TOOL ID |
|---|---|---|
| b1 | ⑥ | P2 |
| b2 | ⑦ | P2 |
| b3 | ⑨ | P2 |
| b3 | ⑩ | P2 |

| RECORDING MEDIUM ID | WRITING TIME | WRITING TOOL ID |
|---|---|---|
| c1 | ⑪ | P1 |
| c2 | ④ | P1 |
| c2 | ⑤ | P1 |
| c3 | ⑬ | P1 |

FIG. 11B

| RECORDING MEDIUM ID | WRITING TIME | WRITING TOOL ID |
|---|---|---|
| a1 | ① | P1 |
| a2 | ⑫ | P1 |
| a3 | ⑧ | P1 |
| c1 | ⑪ | P1 |
| c2 | ④ | P1 |
| c3 | ⑬ | P1 |

| RECORDING MEDIUM ID | WRITING TIME | WRITING TOOL ID |
|---|---|---|
| b1 | ⑥ | P2 |
| b2 | ⑦ | P2 |
| b3 | ⑨ | P2 |

FIG. 11C

| RECORDING MEDIUM ID | WRITING TIME | WRITING TOOL ID | NEW REFLECTED DOCUMENT INFORMATION ID |
|---|---|---|---|
| a1 | ① | P1 | 0001-A2 |
| c2 | ④ | P1 | 0001-A2 |
| a3 | ⑧ | P1 | 0001-A2 |
| c1 | ⑪ | P1 | 0001-B2 |
| a2 | ⑫ | P1 | 0001-B2 |
| c3 | ⑬ | P1 | 0001-B2 |
| b1 | ⑥ | P2 | 0001-C2 |
| b2 | ⑦ | P2 | 0001-C2 |
| b3 | ⑨ | P2 | 0001-C2 |

DOCUMENT MANAGEMENT APPARATUS AND COMPUTER READABLE MEDIUM STORING PROGRAM

CROSS-REFERENCE TO RELATED APPLICATION

This application is based on and claims priority under 35 USC 119 from Japanese Patent Application No. 2010-210495 filed Sep. 21, 2010.

BACKGROUND

Technical Field

The present invention relates to a document management apparatus and a computer readable medium storing a program.

SUMMARY

According to an aspect of the present invention, there is provided a document management apparatus including: a memory that holds an electronic document of plural pages; a written information acquisition unit that obtains information on writing with respect to respective pages of recording media on which the electronic document stored in the memory is outputted; and a page arrangement generation unit that generates a page arrangement of the electronic document based on the information on the writing obtained by the written information acquisition unit.

BRIEF DESCRIPTION OF THE DRAWINGS

Exemplary embodiments of the present invention will be described in detail based on the following figures, wherein:

FIGS. 5A and 5B are tables showing examples of reflected document information and written information in the first exemplary embodiment of the present invention;

FIGS. 6A and 6B are explanatory views of outlines of functions of the document management apparatus in the first exemplary embodiment of the present invention;

FIGS. 9A to 9C are explanatory views schematically showing statuses of the update operation of the document management apparatus in the first exemplary embodiment of the present invention;

FIGS. 11A to 11C are explanatory views schematically showing statuses of the update operation of the document management apparatus in the second exemplary embodiment of the present invention.

DETAILED DESCRIPTION

First Embodiment

Exemplary embodiments of the present invention will be described based on the drawings.

Figure 1:
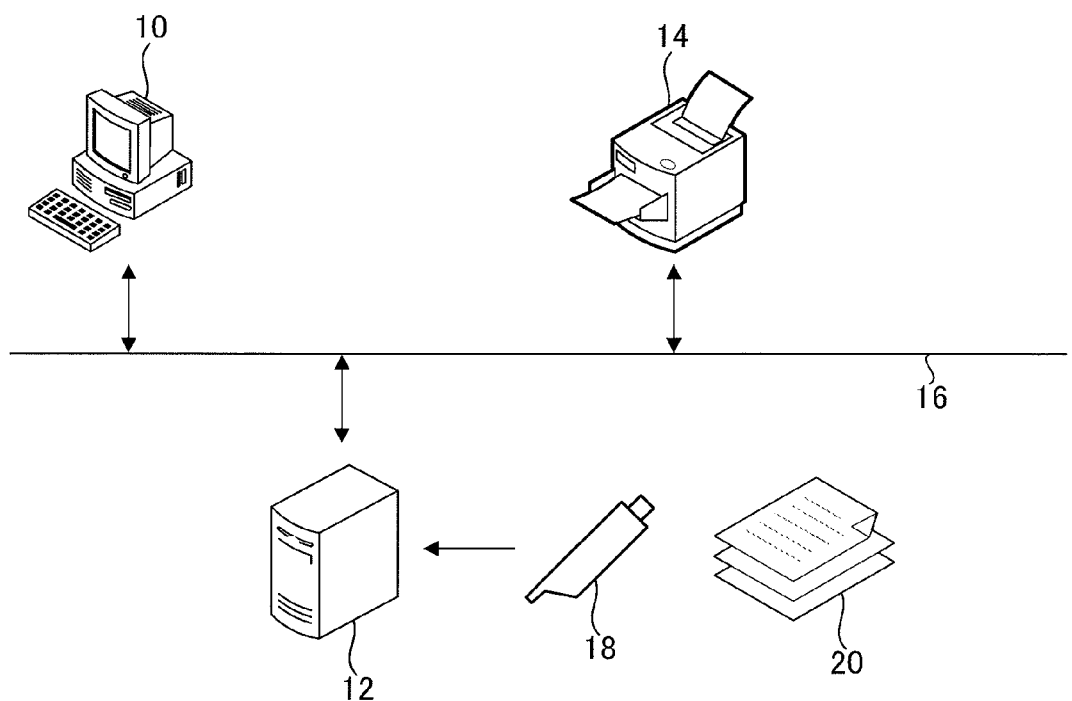
FIG. 1 schematically illustrates a document management system to which a first exemplary embodiment of the present invention is applied.

FIG. 1 schematically shows a configuration of a document management system 1 according to a first exemplary embodiment of the present invention.

The document management system 1 has a terminal device 10, a document management apparatus 12 and an image forming apparatus 14, interconnected via a network 16 such as a LAN or a WAN.

The terminal device 10 generates electronic document information in correspondence with a user's request, or instructs to print-output the contents of the electronic document information on a recording medium such as a print sheet (hereinbelow, the operation may be referred to as a "print instruction").

The electronic document information means electronically formed document information (electronic document).

As the terminal device 10, a PC (Personal Computer) or the like is used.

The document management apparatus 12, holding the electronic document information, generates predetermined superimposed document information in correspondence with a print instruction. The superimposed document information means electronically-formed document information where identification information and position information are superimposed on electronic document information.

The identification information includes information for unique identification of a recording medium (recording medium ID). Note that as the identification information, information for unique identification of electronic document information printed on a recording medium (document ID including a document number and page number) may be included.

The position information includes information for identification of a coordinate position on a recording medium.

As the document management apparatus 12, a general-purpose server computer or the like is used.

The document management apparatus 12 obtains identification information and position information from a printed document 20 via an electronic writing tool 18.

The printed document 20 is a document print-outputted on plural pages of recording media based on superimposed document information.

The electronic writing tool 18 has a function of writing down in the printed document 20 and stores and transmits the written-down information (hereinbelow may be referred to as "written information"). The written information includes time of writing (writing time), identification information of the recording medium where the writing has been made (recording medium ID) and information to specify the position on the recording medium recording the written content (by e.g. one stroke). The position on the recording medium is specified based on position information formed on the printed document 20.

As the electronic writing tool 18, a pen device such as an electronic pen is used.

The image forming apparatus 14 forms an image on a recording medium. When the image forming apparatus 14 receives superimposed document information from the document management apparatus 12, the image forming apparatus 14 forms an image on a recording medium based on the superimposed document information. In this manner, the printed document 20 including the content of the electronic document information as well as the identification information and position information is formed.

As the image forming apparatus 14, an electrophotography apparatus or the like is used.

Next, the hardware configuration of the document management apparatus 12 will be described.

Figure 2:
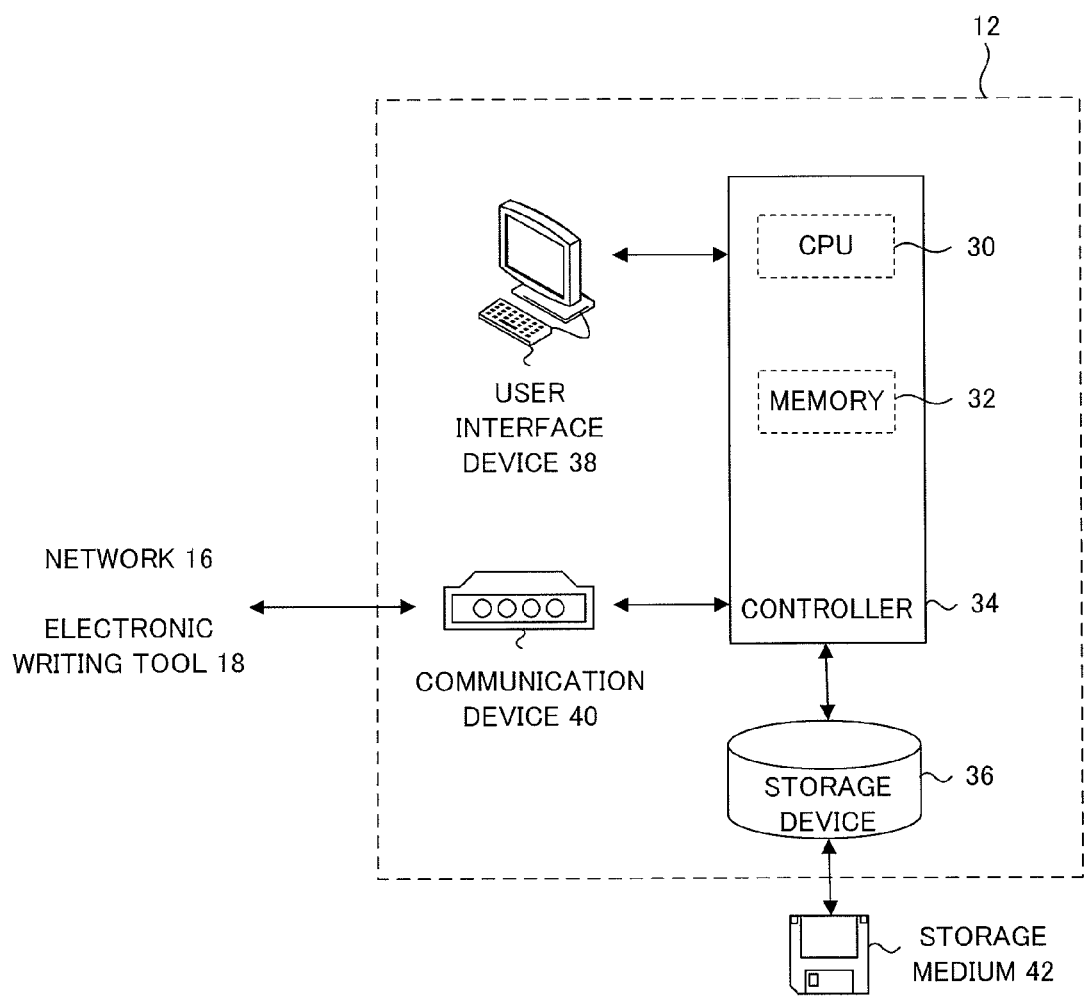
FIG. 2 is a block diagram showing a hardware configuration of a document management apparatus to which the first exemplary embodiment of the present invention is applied.

FIG. 2 shows the hardware configuration of the document management apparatus 12.

The document management apparatus 12 has a controller 34 including a CPU 30, a memory 32 and the like, a storage device 36 such as a hard disk drive (HDD), a user interface (UI) device 38 including a display such as a liquid crystal display and an input device such as a keyboard and a mouse, and a communication device 40 to perform transmission/reception of information via a network 16 to/from the image forming apparatus 14 and the like or receive information from the electronic writing tool 18.

In the document management apparatus 12, a predetermined document management program is stored in the storage device 36 via the communication device 40 or a storage medium 42 such as a compact disc (CD), loaded to the memory 32, and executed on an OS (Operating System) (not shown) which operates on the controller 34.

Further, the terminal device 10 has the same hardware configuration as that of the document management apparatus 12. In the terminal device 10, the communication device 40 performs information transmission/reception via the network 16 to/from the document management apparatus 12 and the like.

Next, the functional configuration of the document management apparatus 12 realized by execution of the document management program will be described.

Figure 3:
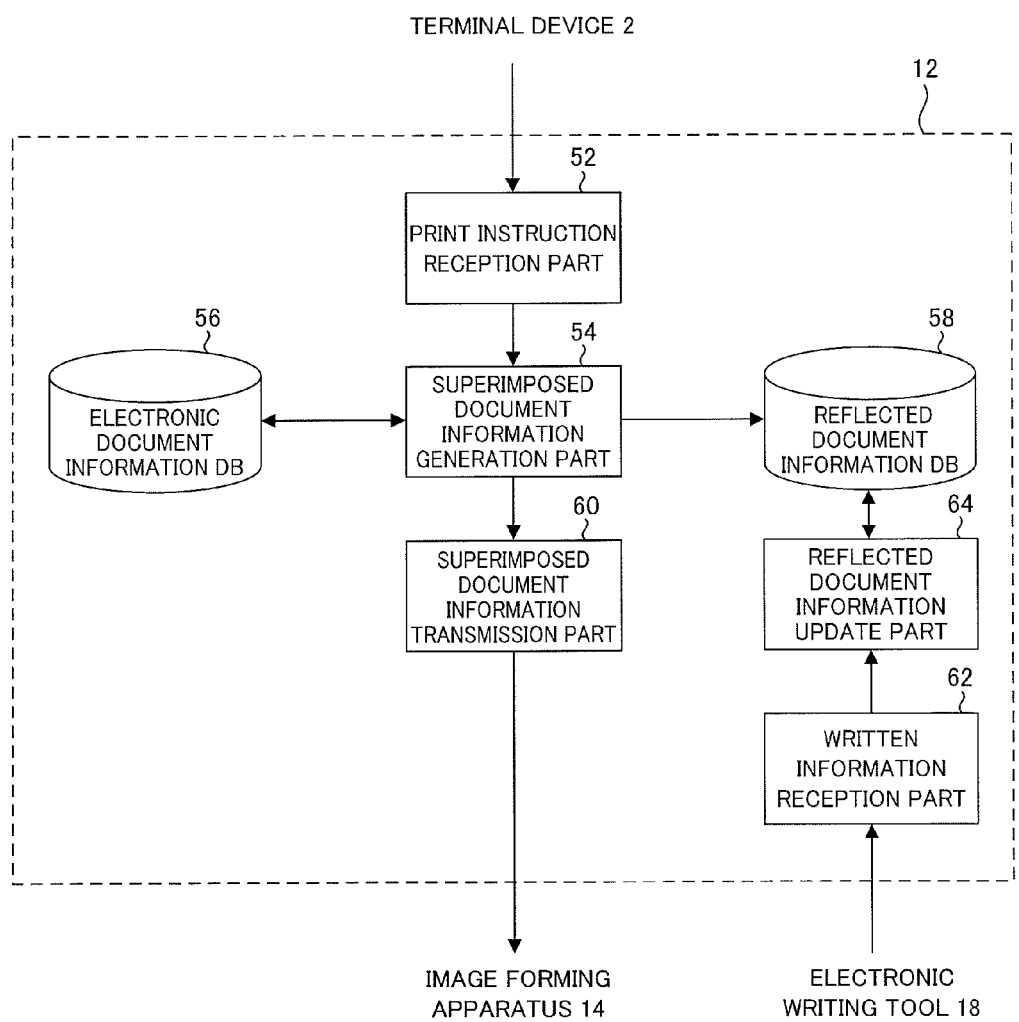
FIG. 3 is a block diagram showing a functional configuration of the document management apparatus to which the first exemplary embodiment of the present invention is applied.

FIG. 3 is a block diagram showing the functional configuration of the document management apparatus 12.

The document management apparatus 12 has a print instruction reception part 52, a superimposed document information generation part 54 an electronic document information storage part (electronic document information DB) 56, a reflected document information storage part (reflected document information DB) 58, a superimposed document information transmission part 60, a written information reception part 62, and a reflected document information update part 64.

The print instruction reception part 52 receives a print instruction transmitted from the terminal device 10. The print instruction includes information to designate electronic document information to be print-outputted (which electronic document information is to be print-outputted) and to designate the number of print copies (the number of copies to be print-outputted).

The print instruction reception part 52 requests the superimposed document information generation part 54 to generate superimposed document information in accordance with the print instruction.

The superimposed document information generation part 54 superimposes identification information and position information on electronic document information stored in the electronic document information DB 56 to generate superimposed document information.

The superimposed document information generation part 54 associates a document ID with a recording medium ID of a recording medium on which the document is to be print-outputted, and further, associates the printed document 20 where the electronic document information (the same document number) is printed with information to identify the document (reflected document information ID), and stores the information as reflected document information into the reflected document information DB 58.

The reflected document information is electronic document information corresponding to the printed document 20, in which the written content on the printed document 20 is reflected.

For example, upon issuance of a print instruction to print-output the same electronic document information (document number 0001) for plural copies, the superimposed document information generation part 54 generates reflected document information corresponding to the respective plural copies of printed documents 20, and stores the information into the reflected document information DB 58.

More particularly, the superimposed document information generation part 54 assigns reflected document information IDs (0001-A0, 0001-B0, . . . ) to the respective plural copies of printed documents 20 and stores the IDs into the reflected document information DB 58 (see FIG. 5A).

That is, the reflected document information DB 58 holds the plural copies of printed documents 20, printed based on the respective plural superimposed document information, in statuses discriminated with the reflected document information IDs. Accordingly, a content written in some printed document 20 (reflected document information ID "0001-A0") is reflected in the reflected document information corresponding to the reflected document information ID "0001-A0" stored in the reflected document information DB 58 (not reflected in the reflected document information corresponding to the reflected document information ID "0001-B0").

The superimposed document information transmission part 60 transmits the superimposed document information to the image forming apparatus 14. The image forming apparatus 14 forms the printed document 20 based on the transmitted superimposed document information.

The written information reception part 62 receives written information from the electronic writing tool 18.

When the written information reception part 62 receives the written information, the written information reception part 62 requests the reflected document information update part 64 to update the reflected document information.

The reflected document information update part 64 updates the reflected document information stored in the reflected document information DB 58 base on the written information.

More particularly, the reflected document information update part 64 adds the content written in the printed document 20, and generates a new reflected document information ID corresponding to the printed document 20.

Next, the hardware configuration of the electronic writing tool 18 will be described.

Figure 4:
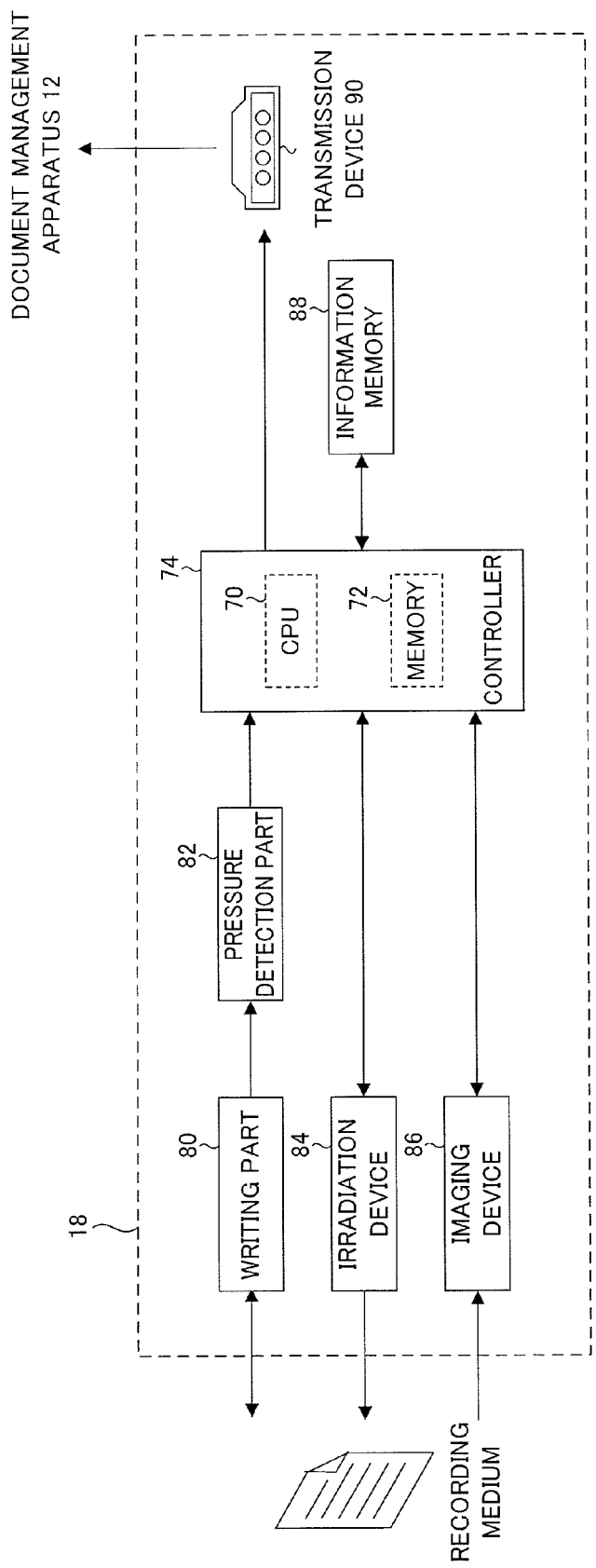
FIG. 4 is a block diagram showing a hardware configuration of an electronic writing tool to which the first exemplary embodiment of the present invention is applied.

FIG. 4 shows the hardware configuration of the electronic writing tool 18.

The electronic writing tool 18 includes a CPU 70, a memory 72 and the like, and has a controller 74 to control the entire operation, a writing part 80 in contact with a recording medium to write-down on the recording medium with ink or the like, a pressure detection part 82 to detect pressure applied to the writing part 80, an irradiation device 84 such as an infrared LED to emit e.g. infrared light on the recording medium, an imaging device 86 such as an infrared CMOS sensor or a CCD to input an image on the recording medium, an information memory 88 to hold written information and the identification information (writing tool ID) of the electronic writing tool 18 itself, and a transmission device 90 to transmit the information stored in the information memory 88 to the document management apparatus 12.

When writing is performed with the electronic writing tool 18, pressure is applied from the recording medium side to the writing part 80, and the pressure detection part 82 detects the applied pressure. When the pressure detection part 82 detects the pressure, the controller 74 turns the irradiation device 84 on, and controls the imaging device 86 to perform imaging on the image on the recording medium.

The controller 74 obtains identification information and position information from the image obtained with the imaging device 86 and generates written information. The controller 74 stores the generated written information into the information memory 88. The controller 74 periodically transmits the written information stored in the information memory 88 from the transmission device 90 to the document management apparatus 12.

In this manner, the content written in the printed document 20 is reflected in the reflected document information stored in the reflected document information DB 58.

Next, the reflected document information stored in the reflected document information DB 58 of the document management apparatus 12, and the written information received with the document management apparatus 12 from the electronic writing tool 18 will be described.

FIG. 5A shows the reflected document information stored in the reflected document information DB 58. FIG. 5B shows the written information (in the written information, information on the written content is and will be omitted.).

As shown in FIG. 5A, the reflected document information DB 58 holds a document ID, a recording medium ID, and a reflected document information ID, associated with each other.

That is, in each recording medium included in the printed document 20, the content printed on the medium (document number and the page number) and its reflected document information are specified.

As shown in FIG. 5B, the written information includes a recording medium ID of the recording medium on which writing has been made and writing time as time of the writing.

That is, the recording medium included in the printed document 20 and the time of the writing of the written content are specified with the written information.

Next, the details of the function of the document management apparatus 12 will be described.

First, the outline of the function of the document management apparatus 12 will be described.

FIGS. 6A and 6B are explanatory views of the outline of the function of the document management apparatus 12. Hereinbelow, electronic document information of three pages is print-outputted as a printed document 20 of three pages (three recording media) for three copies.

As shown in FIG. 6A, the reflected document information DB 58 of the document management apparatus 12 holds respective printed documents 20 having the same electronic document information, to which reflected document information IDs (0001-A0, 0001-B0 and 0001-C0) are assigned.

The respective printed documents 20 are delivered to three points (three different positions, persons or the like) as packs corresponding to the reflected document information IDs. For example, in one of the points, when writing is made regarding the recording medium IDs (b1, b2 and b3) of the printed document 20, the written content is reflected in the corresponding reflected document information.

More particularly, in the reflected document information DB 58, the written content is reflected regarding the respective recording medium IDs (b1, b2 and b3) of the reflected document information ID (0001-B0).

However, as shown in FIG. 6B, regarding the printed document 20, in some cases, packs of information corresponding to the reflected document information ID 58 are broken in delivery. That is, for example, the second pages are exchanged, and the printed document 20 is packed as recording medium IDs (a1, b2 and a3) and recording medium IDs (b1, a2 and a3).

In this case, the reflected document information corresponding to the respective packs is not stored in the reflected document information DB 58. Accordingly, there is no reflected document information reflecting the written content.

More particularly, in one point, when writing is performed regarding the recording medium IDs (a1, b2 and a3) of the printed document 20, the written content is reflected in the recording medium IDs (a1 and a3) of the reflected document information ID (0001-A0) and the recording medium ID (b2) of the reflected document information ID (0001-B0), in the reflected document information DB 58.

The document management apparatus 12 has a function of generating reflected document information in correspondence with actually-packed printed document 20.

That is, in the above example, the document management apparatus 12 determines the pack of the recording medium IDs (a1, b2 and a3) as new reflected document information (reflected document information ID (0001-A1)), and determines the pack of the recording medium IDs (b1, a2 and b3) as new reflected document information (reflected document information ID (0001-B1)). Accordingly, reflected document information reflecting the written content corresponding to the printed document 20 exists.

Next, the operation of the document management apparatus 12 will be described.

Figure 7:
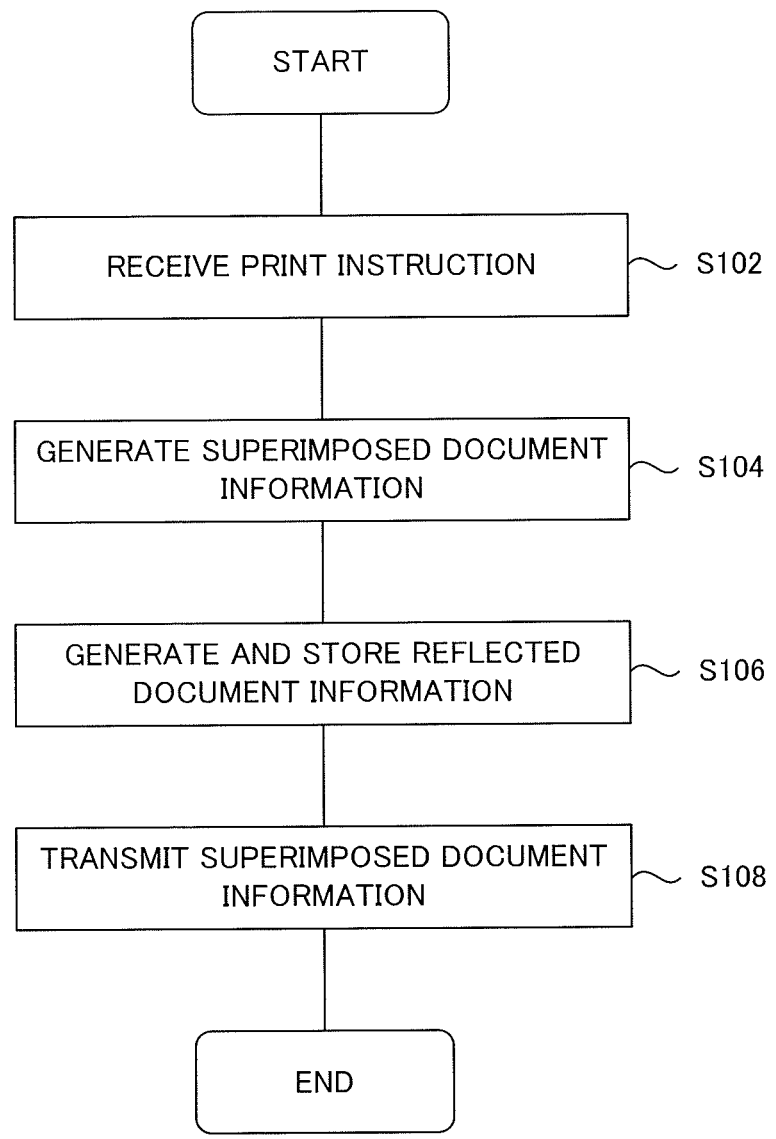
FIG. 7 is a flowchart showing a print start operation of the document management apparatus in the first exemplary embodiment of the present invention.

FIG. 7 is a flowchart showing a print start operation (S10) of the document management apparatus 12.

At step S102, the print instruction reception part 52 receives a print instruction from a terminal device 2. Upon reception of a print instruction, the print instruction reception part 52 requests the superimposed document information generation part 54 to generate superimposed document information.

The print instruction includes information on a document ID, the number of print copies and the like designated by a user.

At step S104, the superimposed document information generation part 54 generates superimposed document information.

More particularly, when the superimposed document information generation part 54 receives a request for generation of superimposed document information from the print instruction reception part 52, the superimposed document information generation part 54 superimposes identification information and position information on the predetermined electronic document information stored in the electronic document information DB 56 in accordance with the request.

At step S106, the superimposed document information generation part 54 generates reflected document information and stores the information into the reflected document information DB 58.

At step S108, the superimposed document information transmission part 60 transmits the superimposed document information to the image forming apparatus 14.

Figure 8:
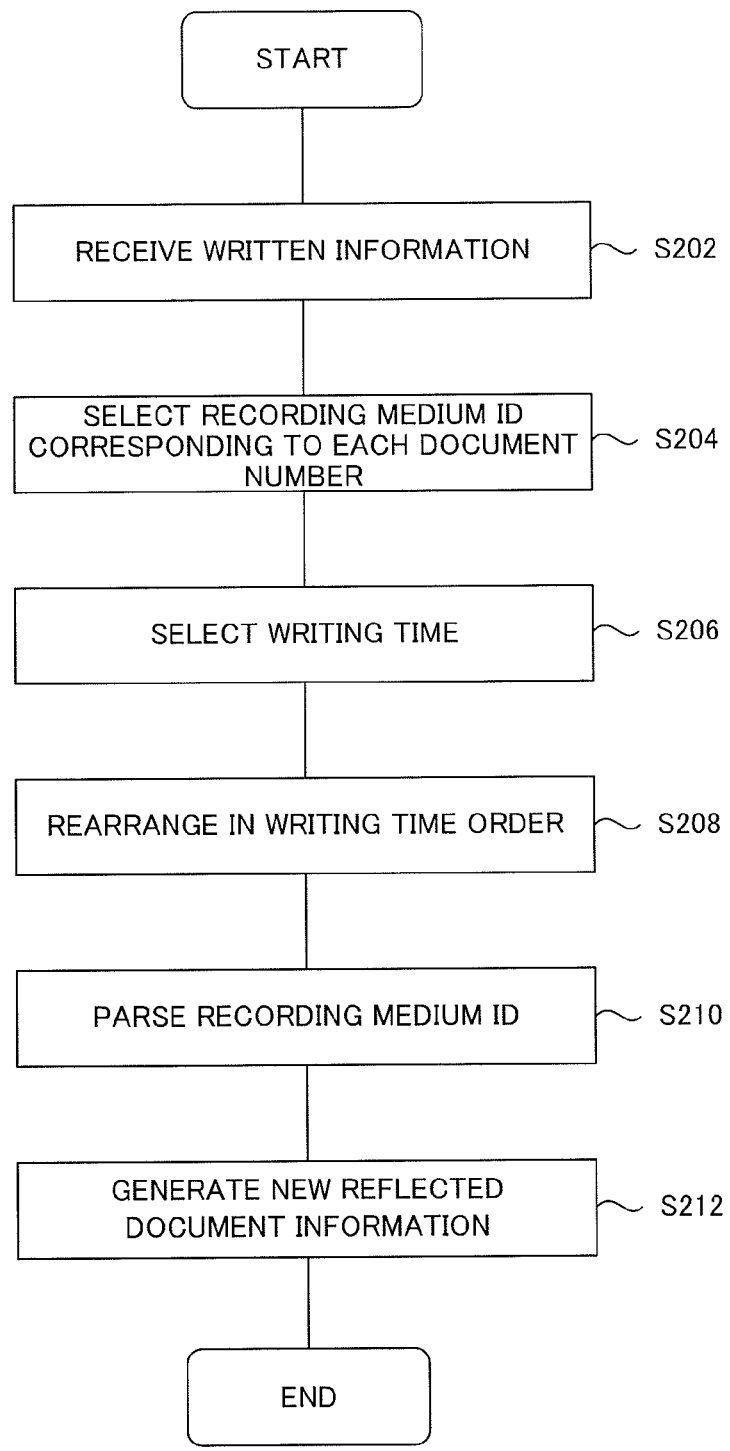
FIG. 8 is a flowchart showing an update operation of the document management apparatus in the first exemplary embodiment of the present invention.

FIG. 8 is a flowchart showing an update operation (S20) of the document management apparatus 12.

FIGS. 9A to 9C are explanatory views schematically showing statuses of the update operation (S20) of the document management apparatus 12. Note that in FIGS. 9A to 9C, numbers in circles indicate dates in ascending order.

At step S202, the written information reception part 62 receives written information from the electronic writing tool 18, and transfers the received written information to the reflected document information update part 64.

At step S204, the reflected document information update part 64 obtains the written information, and selects a recording medium ID by document number.

More particularly, the reflected document information update part 64 refers to the reflected document information DB 58, and, by document number, selects written information with a recording medium ID (e.g., a1 to a3, b1 to b3 or c1 to c3) corresponding to a recording medium on which electronic document information of the document number (e.g. 0001) is print-outputted.

At step S206, the reflected document information update part 64 selects a recording medium ID with the oldest date regarding recording medium ID having plural writing times. That is, regarding the same recording medium ID, a recording medium with the oldest writing time is adopted.

As shown in FIG. 9A, regarding recording medium IDs (a1, b3, c2 and c3) having plural writing times in the written information, recording media with new writing time are removed and a recording medium with the oldest writing time is selected.

At step S208, the reflected document information update part 64 rearranges the written information in ascending order.

As shown in FIG. 9B, as the recording medium ID (b2) is the second oldest following the recording medium ID (a1), it is rearranged to a position following the recording medium ID (a1). Further, as the recording medium ID (a2) is the second oldest following the recording medium ID (b1), it is rearranged to a position following the recording medium ID (b1).

At step S210, the reflected document information update part 64 parses the recording medium IDs in accordance with writing time in ascending order.

Then, the reflected document information update part 64 compares the parse result of the recording medium ID with information stored in the reflected document information DB 58, and extracts a page corresponding to each document number in accordance with writing time in ascending order.

At step S212, when all the pages corresponding to a document number have been extracted, the reflected document information update part 64 packs them to generate new reflected document information. The reflected document information update part 64 assigns a new reflected document information ID to the new reflected document information and stores the information into the reflected document information DB 58.

As shown in FIG. 9C, in accordance with writing time in ascending order, page 1 is extracted from the recording medium ID (a1); page 2, from the recording medium ID (b2); and page 3, from the recording medium ID (a3). In this manner, all the pages (3 pages) corresponding to the document number 0001 have been extracted. Then, the recording medium IDs (a1, b2 and a3) are packed as new reflected document information, then a new reflected document information ID (0001-A1) is assigned to the information, and the information is stored.

Next, in accordance with writing time in ascending order, page 1 is extracted from the recording medium ID (b1); page 2, from the recording medium ID (a2); and page 3, from the recording medium ID (b3). In this manner, all the pages (3 pages) corresponding to the document number 0001 have been extracted. Then, the recording medium IDs (b1, a2 and b3) are packed as new reflected document information, a new reflected document information ID (0001-B1) is assigned to the information, and the information is stored.

Similarly, a new reflected document information ID (0001-C1) is assigned to recording medium Ids (c1, c2 and c3) and the information is stored.

In this manner, the document management apparatus 12 manages the reflected document information associated with the delivered printed documents 20.

As the printed document 20, forms, log books, daily reports and the like can be given.

In the above-described exemplary embodiment, when all the pages corresponding to a document number have been extracted, they are packed as new reflected document information. However, the present invention is not limited to this arrangement. It may be arranged such that the packing is changed to e.g. packing by date, time or the like in accordance with the characteristic of the printed document 20.

For example, when the printed document 20 is a daily job time report made every day, the information may be packed as new reflected document information by date. Or, when the printed document 20 is a check sheet checked by hour, the information may be packed as new reflected document information by hour.

In the above-described exemplary embodiment, the reflected document information is newly generated and stored. However, the present invention is not limited to this arrangement. It may be arranged such that based on document management information ID stored in the reflected document information DB 58, a recording medium ID to form a reflected document is regenerated by overwriting the document management information ID.

For example, it may be arranged such that, by reflected document information ID, regarding the reflected document information ID, the recording medium ID included in the reflected document information ID is regenerated by using e.g. a recording medium ID in which page 1 is print-outputted as a reference.

In the above-described exemplary embodiment, the superimposed document information generation part 54 associates the printed document 20 with the corresponding reflected document information ID and stores the document into the reflected document information DB 58 before transmission of superimposed document information. However, the present invention is not limited to this arrangement. It may be arranged such that superimposed document information generation part 54 stores only information on the document ID associated with the recording medium ID into the reflected document information DB 58 without assignment of the reflected document information ID to the printed document 20.

That is, it may be arranged such that the document management apparatus 12 assigns a reflected document information ID, in correspondence with an actually delivered printed document 20, based on the printed document 20.

Second Embodiment

Next, a second exemplary embodiment will be described.

Figure 10:
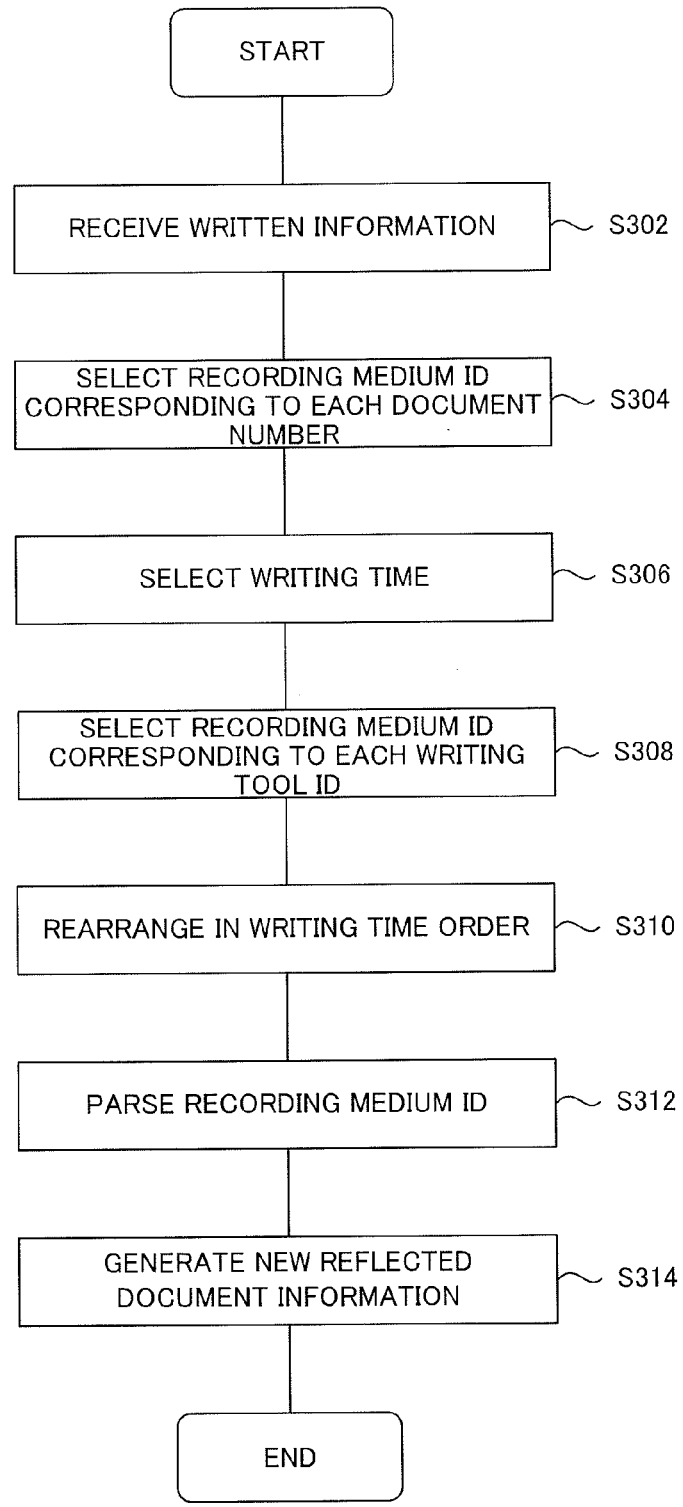
FIG. 10 is a flowchart showing the update operation of the document management apparatus in a second exemplary embodiment of the present invention.

FIG. 10 is a flowchart showing the update operation (S30) of the document management apparatus 12 according to the second exemplary embodiment.

FIGS. 11A to 11C are explanatory views schematically showing statuses of the update operation (S30) of the document management apparatus 12. Note that in FIGS. 11A to 11C, the writing times are represented as numbers in circles in accordance with date and time in ascending order.

At step S302, the written information reception part 62 receives written information from the electronic writing tool 18, and transfers the received written information to the reflected document information update part 64.

In the present exemplary embodiment, the written information includes a recording medium ID of a recording medium on which writing has been made, writing time of the writing, and a writing tool ID to identify the electronic writing tool 18 used for the writing.

When the writing tool IDs are the same, it is assumed that the writing has been performed in the same position (by the same person). When the writing tool IDs are different, it is assumed that the writing has been performed in different positions (by different persons).

At step S304, the reflected document information update part 64 obtains written information, and selects a recording medium ID by document number.

More particularly, the reflected document information update part 64 refers to the reflected document information DB 58, and by document number, selects written information with recording medium IDs (e.g. a1 to a3, b1 to b3 and c1 to c3) corresponding to recording media on which the electronic document information of the document number (e.g. 0001) is written.

At step S306, regarding recording medium IDs having plural writing times, the reflected document information update part 64 selects a recording medium ID with the oldest date and time as writing time. That is, regarding the same recording medium ID, a recording medium ID with the oldest writing time is adopted.

As shown in FIG. 11A, regarding overlapped recording medium IDs (a1, b3 and c2) having plural writing times in the written information, recording medium IDs with new writing times are removed, and a recording medium ID with the oldest writing time is selected.

At step S308, the reflected document information update part 64 selects a recording medium ID by writing tool ID.

As shown in FIG. 11B, in the written information, recording medium IDs (a1, a2, a3, c1, c2 and c3) corresponding to a writing tool ID (P1) are separated from recording medium IDs (b1, b2 and b3) corresponding to a writing tool ID (P2).

At step S310, the reflected document information update part 64 rearranges the respective written information selected based on writing tool ID in accordance with writing time in ascending order.

As shown in FIG. 11C, regarding the writing tool ID (P1), the recording medium ID (c2), which is the second oldest following the recording medium ID (a1), is rearranged to a position following the recording medium ID (a1). Further, the recording medium ID (a2), which is the second oldest following the recording medium ID (b1), is rearranged to a position following the recording medium ID (b1).

Regarding the writing tool ID (P2), in FIG. 11C, since the recording medium IDs are arranged in accordance with writing time in ascending order, rearrangement is not performed.

At step S312, regarding the respective written information selected based on writing tool ID, the reflected document information update part 64 parses the recording medium IDs in accordance with writing time in ascending order.

Then, the reflected document information update part 64 compares the parse results of the recording medium IDs with the information stored in the reflected document information DB 58, and extracts a page corresponding to a document number in accordance with writing time in ascending order.

At step S314, when all the pages corresponding to a document number have been extracted, the reflected document information update part 64 packs them to generate new reflected document information. The reflected document information update part 64 assigns a new reflected document information ID to the new reflected document information and stores the information into the reflected document information DB.

As shown in FIG. 11C, regarding the writing tool ID (P1), page 1 is extracted from the recording medium ID (a1); page 2, from the recording medium ID (c2); and page 3, from the recording medium ID (a3), in accordance with writing time in ascending order. In this manner, all the pages (3 pages) corresponding to the document number 0001 have been extracted. Then the recording medium IDs (a1, c2 and a3) are packed as new reflected document information, and a new reflected document information ID (0001-A2) is assigned to the information and the information is stored.

Next, page 1 is extracted from the recording medium ID (c1); page 2, from the recording medium ID (a2); and page 3, from the recording medium ID (c3) in accordance with writing time in ascending order. In this manner, all the pages (3 pages) corresponding to the document number 0001 have been extracted. Then the recording medium IDs (c1, a2 and c3) are packed as new reflected document information, a new reflected document information ID (0001-B2) is assigned to the information and the information is stored.

Similarly, regarding the writing tool ID (P2), a new reflected document information ID (0001-C2) is assigned to the recording medium IDs (b1, b2 and b3) and the information is stored.

In the above-described exemplary embodiment, reflected document information is generated based on writing time and writing tool ID. However, the resent invention is not limited to this arrangement. It may be arranged such that the reflected document information is generated only based on writing tool ID without writing time.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management apparatus comprising:
a memory that stores an electronic document of a plurality of pages;
a written information acquisition unit that obtains information on writing with respect to respective pages of recording media on which the electronic document stored in the memory is outputted; and
a page arrangement generation unit that generates a page arrangement of the electronic document based on the information on the writing obtained by the written information acquisition unit,
wherein the memory stores a plurality of copies of the electronic document respectively associated with statuses of the electronic document; and the page arrangement generation unit generates respective page arrangements of the plurality of copies of the electronic document, and wherein the generating respective page arrangements of the plurality of copies of the electronic document comprises rearranging the plurality of copies of the electronic document based on a writing time order of the plurality of copies of the electronic document.

2. The document management apparatus according to claim 1, wherein the written information acquisition unit obtains written information with the oldest time with respect to the same page of the recording medium.

3. The document management apparatus according to claim 1, wherein the written information acquisition unit obtains writing tool identification information as information on writing.

4. A computer readable medium storing a program causing a computer to execute a process comprising:

storing an electronic document of a plurality of pages;

obtaining information on writing with respect to respective pages of recording media on which the stored electronic document is outputted; and generating a page arrangement of the electronic document based on the obtained information on the writing, wherein the storing comprises storing a plurality of copies of the electronic document respectively associated with statuses of the electronic document, and the generating comprises generating respective page arrangements of the plurality of copies of the electronic document, and wherein the generating respective page arrangements of the plurality of copies of the electronic document comprises rearranging the respective page arrangements based on a writing time order of the respective page arrangements.

5. The computer readable medium of claim 4, wherein the obtaining further comprises obtaining written information with the oldest time with respect to the same page of the recording medium.

* * * * *